B. C. SWINEHART.
VEHICLE WHEEL TIRE.
APPLICATION FILED SEPT. 9, 1911.
1,021,711.
Patented Mar. 26, 1912.
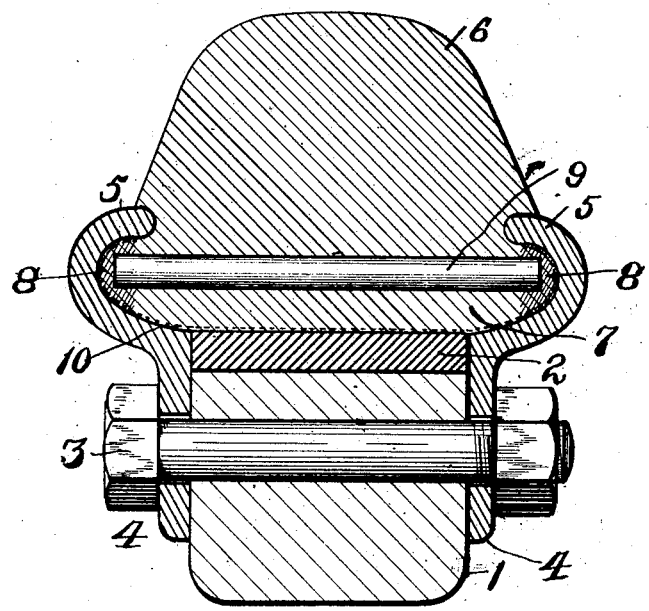
Witnesses:
A. E. King
J. M. Grable
Inventor
Benjamin C. Swinehart
by C. E. Humphrey
Atty.

UNITED STATES PATENT OFFICE.

BENJAMIN C. SWINEHART, OF YOUNGSTOWN, OHIO.

VEHICLE WHEEL-TIRE.

1,021,711.  Specification of Letters Patent.  Patented Mar. 26, 1912.

Application filed September 9, 1911. Serial No. 648,548.

*To all whom it may concern:*

Be it known that I, BENJAMIN CLIFFORD SWINEHART, a citizen of the United States, residing at Youngstown, in the county of Mahoning and State of Ohio, have invented new and useful Improvements in Vehicle Wheel-Tires, of which the following is a specification.

This invention relates to improvements in elastic tires for vehicles and the object thereof is to provide improved means for stiffening and strengthening the base portions thereof.

My invention contemplates the provision of an elastic tire for use on vehicle wheels, having incorporated in the base thereof a plurality of spaced transversely extending bars or wires, with the ends of the bars terminating in bodies of material of the same general nature as the body of the tire but of a character which when vulcanized will be harder than the balance of the tire, so that ends of the bars are rigidly anchored against movement to prevent the ends from wearing the elastic soft rubber of the tire. This is usually accomplished by forming hard rubber strips either in or along the lateral faces of the tire base into which the ends of the transverse bars project and are embedded, whereby the ends of the bars are covered and inclosed by a hard unyielding wear-resisting medium which readily adheres to them during vulcanization and which in turn securely attaches itself to the main body of the tire. In use it is contemplated that the tire will be seated in a laterally contractible rim for squeezing the base of the tire after the seating thereof in order to hold the ends of the cross bars firmly embedded in the hard rubber.

By this construction the central portions of the bars are inclosed and submerged in the interposed soft resilient rubber of the tire, and the latter is permitted to move or distort under a load in following the well known rule that the rubber along the transverse central portions of a vehicle tire, moves or is distorted under service conditions to a considerably greater extent than are the portions which lie adjacent to the rim flanges.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

The drawing presented is a view in transverse section of the rim portion of a vehicle wheel, showing a tire embodying my invention in operative relation therewith.

Referring to the drawing in detail, the reference numeral 1 denotes the felly of a vehicle wheel on which is mounted the usual felly-band 2. Secured to the lateral faces of the felly 1 by bolts 3 are a pair of flanges 4, having their outer portions formed with laterally inturned hook shaped clencher flanges 5 for holding a tire detachably in position on the felly band 2, and simultaneously squeezing or distorting the base thereof as the nuts on the bolts are rotated to draw the flanges 3 inwardly toward each other.

Mounted on the felly-band 2 and held in place by the rim fingers 5 is an elastic tire comprising a tread 6 of any preferred construction and a base 7 shaped to seat in the rim formed to receive it and comprising the band 2 and flanges 5. The sides of the base of the tire are formed with lateral beads 8 of a vulcanizable compound which when cured will become harder and less resilient than the balance of the tire and intimately united therewith during the vulcanizing process so as to form when finished a unitary tire having a soft resilient tread and body, with lateral hard rubber beads along the sides of the base portion.

In order to stiffen and strengthen the base of the tire there is incorporated in the base of the tire a series of spaced transversely arranged bars or wires 9 extending from the hard rubber bead on one side through the soft rubber body to the bead on the opposite side, with the ends of the bars terminating in the hard rubber and wholly inclosed thereby so that there will preferably exist a thin stratum of hard rubber between the ends of the bars and the outer surface of the base of the tire. The positioning of the ends of the bars in the hard rubber serves to fixedly anchor them against movement while permitting the soft rubber center of the tire to yield or be distorted under service conditions and as the hard rubber unites with soft rubber much more securely than it would with the metallic bars, the latter are thus held more firmly, and produce little or no wear on the soft rubber when in use and do not cut, grind or tear themselves free from their surroundings as has frequently been found to be the case where the bars are wholly inclosed in soft rubber.

In practice the base of the tire is covered with one or more layers 10 of fabric to prevent wearing the tire when mounted in the rim.

I claim:

An elastic tire having a tread and base of relatively soft rubber, bodies of hard rubber incorporated in and forming parts of the lateral portions of said base, said bodies of hard rubber being completely separated from each other by the interposed body of soft rubber, and a series of bars arranged in spaced relation and extending transversely of the base of the tire and with their ends terminating in and inclosed by the hard rubber of said bodies, whereby said ends are held against movement during the movement or the distortion of the interposed soft rubber portion of the base through which said bars extend.

In testimony whereof I have hereunto set my hand in presence of two subscribing witnesses.

BENJAMIN C. SWINEHART.

Witnesses:
C. E. HUMPHREY,
J. A. SWINEHART.